(12) United States Patent
Stockner et al.

(10) Patent No.: US 10,519,877 B2
(45) Date of Patent: Dec. 31, 2019

(54) MITIGATION OF INTERMITTENT CYLINDER MISFIRE ON DUAL FUEL ENGINES

(71) Applicant: Caterpillar Inc., Peoria, IL (US)

(72) Inventors: Alan R. Stockner, Metamora, IL (US); Thomas J. Crowell, Germantown Hills, IL (US); Scott F. Shafer, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 179 days.

(21) Appl. No.: 15/355,270

(22) Filed: Nov. 18, 2016

(65) Prior Publication Data

US 2018/0142629 A1    May 24, 2018

(51) Int. Cl.
| | |
|---|---|
| *F02D 19/06* | (2006.01) |
| *F02D 33/00* | (2006.01) |
| *F02D 41/00* | (2006.01) |
| *F02B 43/10* | (2006.01) |
| *F02D 41/14* | (2006.01) |
| *F02D 41/22* | (2006.01) |
| *F02D 29/02* | (2006.01) |

(Continued)

(52) U.S. Cl.
CPC .......... *F02D 19/0623* (2013.01); *F02B 43/10* (2013.01); *F02D 19/10* (2013.01); *F02D 29/02* (2013.01); *F02D 35/023* (2013.01); *F02D 41/0025* (2013.01); *F02D 41/0027* (2013.01); *F02D 41/1446* (2013.01); *F02D 41/22* (2013.01); *F02B 2043/103* (2013.01); *F02D 2041/225* (2013.01); *F02D 2200/101* (2013.01); *F02D 2200/1015* (2013.01); *Y02T 10/32* (2013.01); *Y02T 10/36* (2013.01)

(58) Field of Classification Search
CPC .............. F02D 19/0623; F02D 33/006; F02D 41/0025; F02D 2200/1015; F02B 43/10; F02B 2043/103
USPC ..................................................... 123/406.14
See application file for complete search history.

(56) References Cited

U.S. PATENT DOCUMENTS

| | | | | |
|---|---|---|---|---|
| 5,038,744 A | * | 8/1991 | Martin .................... | F02P 9/002 123/625 |
| 5,387,253 A | * | 2/1995 | Remboski, Jr. ........ | G01M 15/11 73/114.05 |

(Continued)

FOREIGN PATENT DOCUMENTS

WO         2014066995 A1     5/2014

*Primary Examiner* — Hung Q Nguyen
*Assistant Examiner* — Susan E Scharpf
(74) *Attorney, Agent, or Firm* — Miller, Matthias & Hull (57) ABSTRACT

A control system for a dual fuel engine having a liquid fuel supply and a gaseous fuel supply is disclosed. The control system may include at least one sensor operably coupled to a cylinder of the dual fuel engine and configured to monitor cylinder condition and transmit a cylinder condition signal. Additionally, a controller may be communicably coupled with the at least one sensor and the controller may be configured to receive the cylinder condition signal and determine whether the cylinder is operating in an abnormal operating condition. Whereas the controller determines the cylinder is operating in the abnormal operating condition, the controller sends a control signal for the liquid fuel supply to provide an amount of liquid fuel which is greater than an amount of liquid fuel supplied to the cylinder during a normal operating condition.

17 Claims, 5 Drawing Sheets

(51) Int. Cl.
*F02D 35/02* (2006.01)
*F02D 19/10* (2006.01)

(56) References Cited

U.S. PATENT DOCUMENTS

| | | | | |
|---|---|---|---|---|
| 5,492,007 | A * | 2/1996 | Noble | F02P 17/12 |
| | | | | 324/393 |
| 5,559,285 | A * | 9/1996 | Bryant | G01M 15/106 |
| | | | | 123/406.27 |
| 5,600,070 | A * | 2/1997 | Wlodarczyk | G01L 9/0077 |
| | | | | 73/715 |
| 5,666,923 | A * | 9/1997 | Collier, Jr. | C10L 3/06 |
| | | | | 123/488 |
| 5,763,769 | A * | 6/1998 | Kluzner | G01L 23/221 |
| | | | | 73/114.09 |
| 5,787,864 | A * | 8/1998 | Collier, Jr. | F02M 21/0215 |
| | | | | 123/436 |
| 5,831,263 | A * | 11/1998 | Komachiya | F02D 35/023 |
| | | | | 250/227.17 |
| 5,935,189 | A * | 8/1999 | Park | G01M 15/11 |
| | | | | 701/111 |
| 6,494,087 | B2 * | 12/2002 | Hatano | G01M 15/11 |
| | | | | 73/114.02 |
| 7,690,353 | B2 | 4/2010 | Shafer et al. | |
| 8,967,502 | B2 | 3/2015 | Kim et al. | |
| 9,234,452 | B2 | 1/2016 | Stockner et al. | |
| 9,234,472 | B2 | 1/2016 | Kim et al. | |
| 2002/0007816 | A1 * | 1/2002 | Zur Loye | F02B 1/04 |
| | | | | 123/295 |
| 2003/0024246 | A1 * | 2/2003 | Beck | F02B 1/12 |
| | | | | 60/599 |
| 2008/0040014 | A1 * | 2/2008 | Yahata | F01N 3/0222 |
| | | | | 701/99 |
| 2013/0311066 | A1 * | 11/2013 | Guimaraes | F02D 41/3094 |
| | | | | 701/104 |
| 2014/0136080 | A1 * | 5/2014 | Sivasubramanian | |
| | | | | F02D 19/0623 |
| | | | | 701/103 |
| 2014/0331970 | A1 * | 11/2014 | Bidner | F02D 19/0642 |
| | | | | 123/435 |
| 2014/0338645 | A1 | 11/2014 | Ariie et al. | |
| 2014/0352801 | A1 * | 12/2014 | McAlister | B60K 15/035 |
| | | | | 137/312 |
| 2015/0075488 | A1 | 3/2015 | Touchette et al. | |
| 2015/0120211 | A1 * | 4/2015 | Michaelis | G01N 33/2829 |
| | | | | 702/22 |
| 2015/0152804 | A1 * | 6/2015 | Sakayanagi | F02D 41/2416 |
| | | | | 701/115 |
| 2015/0167573 | A1 * | 6/2015 | Glugla | G01L 23/225 |
| | | | | 701/104 |
| 2015/0192497 | A1 * | 7/2015 | Gregory | G01M 15/08 |
| | | | | 73/114.08 |
| 2015/0226642 | A1 * | 8/2015 | Urano | F02D 41/009 |
| | | | | 73/114.02 |
| 2015/0285710 | A1 * | 10/2015 | Akazaki | G01M 15/08 |
| | | | | 73/114.16 |
| 2016/0047327 | A1 * | 2/2016 | Suzuki | F02D 41/1497 |
| | | | | 123/349 |
| 2016/0097366 | A1 * | 4/2016 | Kolhouse | F02P 15/08 |
| | | | | 123/568.12 |
| 2016/0108857 | A1 * | 4/2016 | Kanafani | F02M 21/06 |
| | | | | 123/294 |
| 2016/0281615 | A1 * | 9/2016 | Flynn | F02D 19/0642 |
| 2016/0333781 | A1 * | 11/2016 | Sakayanagi | F02D 35/028 |
| 2017/0107924 | A1 * | 4/2017 | Blythe | F02D 41/0085 |

* cited by examiner

MITIGATION OF INTERMITTENT CYLINDER MISFIRE ON DUAL FUEL ENGINES

FIELD OF THE DISCLOSURE

The present disclosure relates generally to engines and, more particularly, relates to a control system and method for mitigation of cylinder misfire in dual fuel engines.

BACKGROUND OF THE DISCLOSURE

Machines, such as off-road machines, on-road machines, motor graders, dozers, trucks, and the like are used in mining, construction, agriculture, petroleum, and other such applications. During operation an engine of the machine may be relied upon to produce a variable amount of power used by the machine implements to perform the task at hand, and to propel the machine in a direction of travel. In one non-limiting example, the machines may be equipped with an engine that utilizes more than one type of fuel. One such type of multi-fuel engine is a dual fuel internal combustion engine configured to use a combination of liquid diesel fuel and natural gas. In a dual fuel engine a small amount of liquid diesel fuel may be supplied for an ignition pilot which ignites a larger quantity of natural gas that supplies the main fuel source to the dual fuel engine. During operation, the machine may be required to traverse across a variety of terrain such as traveling up and down the steep grades of an access road that leads into and out of a mine or quarry. During the descent period the machine may be propelled down the steep grade by gravity (i.e., motoring condition). As a result, the dual fuel engine may consume a reduced amount of liquid diesel fuel and/or natural gas fuel during the motoring condition. Alternatively, in some embodiments during motoring the dual fuel engine may not consume any liquid diesel fuel and/or natural gas. In such conditions, residual combustion gas and/or air may accumulate and/or backflow into one or more cylinders of the dual fuel engine due to the reduced amount of liquid diesel fuel injected into the pilot ignition. The accumulated combustion gas may leak into the diesel injector ignition pilot and cause an abnormal operation of the engine. For example, at the end of the motoring condition the machine may reach the bottom of its descent and the operator may attempt to slowly increase the load (i.e., increase the throttle or accelerator) on the dual fuel engine to maintain or increase the propulsion of the machine in the desired direction of travel. However, if a sufficient amount of combustion gas has accumulated in the diesel injection ignition pilot then the pilot ignition of the diesel fuel may not occur. This may cause an abnormal operation of the engine such as but not limited to, one or more cylinders to misfire, or other such engine malfunction. Such an abnormal operating condition of the engine may cause the machine to operate below optimal levels or in some cases may altogether cease operation of one or more of the cylinders of the machine.

A system for detecting a gaseous fuel leak in dual fuel engines is disclosed in International Patent Application Publication No. WO 2014/066995 entitled, "Method and System for Detecting and Diagnosing a Gaseous Fuel Leak in a Dual Fuel Internal Combustion Engine System," (the '995 publication). The dual fuel engine disclosed therein is equipped with a fuel system for supplying a pilot fuel and a gaseous fuel to the dual fuel internal combustion engine. The fuel system of the '995 publication further includes a controller, a liquid fuel pressure sensor which monitors the pressure in the liquid fuel rail, and a gaseous fuel pressure sensor which monitors the pressure in the gaseous fuel rail. The controller receives the liquid fuel rail pressure and the gaseous fuel rail pressure and calculates the pressure differential between the two received pressures. The pressure differential between the liquid fuel rail and the gaseous fuel rail is maintained such that the liquid fuel is typically kept at a higher pressure to prevent gaseous fuel leakage into the fuel injector. Additionally, to monitor and detect a gaseous fuel leak in the fuel system, a return line pressure sensor is coupled to the liquid fuel return line of the fuel system and configured to continuously monitor the liquid fuel return line pressure. During engine operation, if the gaseous fuel pressure becomes higher than the liquid fuel pressure then gaseous fuel will leak into the liquid fuel within the fuel injector. As a result, an increase of gaseous fuel will be present in the liquid fuel return line and the pressure sensor will measure an increase in the pressure of the liquid fuel return line thereby indicating a gaseous leak in the fuel system.

While arguably effective for the detection of a gaseous fuel leak, the '995 publication does not monitor the individual cylinder pressure of each cylinder in the dual fuel engine to determine whether there is a gaseous fuel leak in the fuel system.

SUMMARY OF THE DISCLOSURE

In accordance with one embodiment, a control system for a dual fuel engine having a liquid fuel supply and a gaseous fuel supply is disclosed. The control system may include at least one sensor operably coupled to a cylinder of the dual fuel engine and configured to monitor a cylinder condition and transmit a cylinder condition signal. The control system may further include a controller communicably coupled with the at least one sensor and the controller may be configured to receive the cylinder condition signal and determine whether the cylinder is operating in an abnormal operating condition. Moreover, when the controller determines the cylinder is operating in the abnormal operating condition, the controller may send a control signal for the liquid fuel supply to provide an amount of liquid fuel to the cylinder, the amount of liquid fuel supplied to the cylinder during the abnormal operating condition being greater than an amount of liquid fuel supplied to the cylinder during a normal operating condition.

In accordance with another embodiment, a method of operating a dual fuel engine is disclosed. The method may include supplying a liquid fuel into a cylinder of the dual fuel engine and supplying a gaseous fuel into the cylinder of the dual fuel engine. The method may further include sensing a cylinder condition with at least one sensor operably coupled to the cylinder and transmitting a cylinder condition signal to a controller configured to analyze the cylinder condition signal. Furthermore, the method may include determining whether the cylinder is operating in an abnormal operating condition based on the cylinder condition signal. Additionally, the method may include transmitting a control signal from the controller commanding a supply of liquid fuel to the cylinder as long as the controller determines that the cylinder is operating in the abnormal operating condition. An amount of liquid fuel supplied to the cylinder during the abnormal operating condition being greater than an amount of liquid fuel supplied to the cylinder during a normal operating condition.

In accordance with yet another embodiment, a machine is disclosed. The machine may include a frame and a dual fuel engine mounted on the frame, and the dual fuel engine may include a plurality of cylinders configured to combust a liquid fuel and a gaseous fuel. The machine may further include a liquid fuel source in communication with each of the plurality of cylinders and configured to supply the liquid fuel to each cylinder of the plurality of cylinders. A gaseous fuel source may be in communication with each of the plurality of cylinders and configured to supply the gaseous fuel to each cylinder on the plurality of cylinders. The machine may additionally include a sensor operably coupled to each cylinder of the plurality of cylinders and configured to monitor a cylinder condition and transmit a cylinder condition signal. A controller may be communicably coupled with the liquid fuel source, the gaseous fuel source, and the sensor. The controller may be configured to receive the cylinder condition signal form the sensor of each cylinder of the plurality of cylinders and determine whether each cylinder is operating in an abnormal operating condition based on the cylinder condition signal. Moreover, as long as the controller determines that a particular cylinder is operating in the abnormal operating condition the controller may transmit a control signal to the liquid fuel source to supply an amount of liquid fuel to the particular cylinder that is greater than an amount of liquid fuel supplied to each of the plurality of cylinders during a normal operating condition.

These and other aspects and features of the present disclosure will be more readily understood upon reading the following detailed description in conjunction with the accompanying drawings.

DETAILED DESCRIPTION

Figure 1:
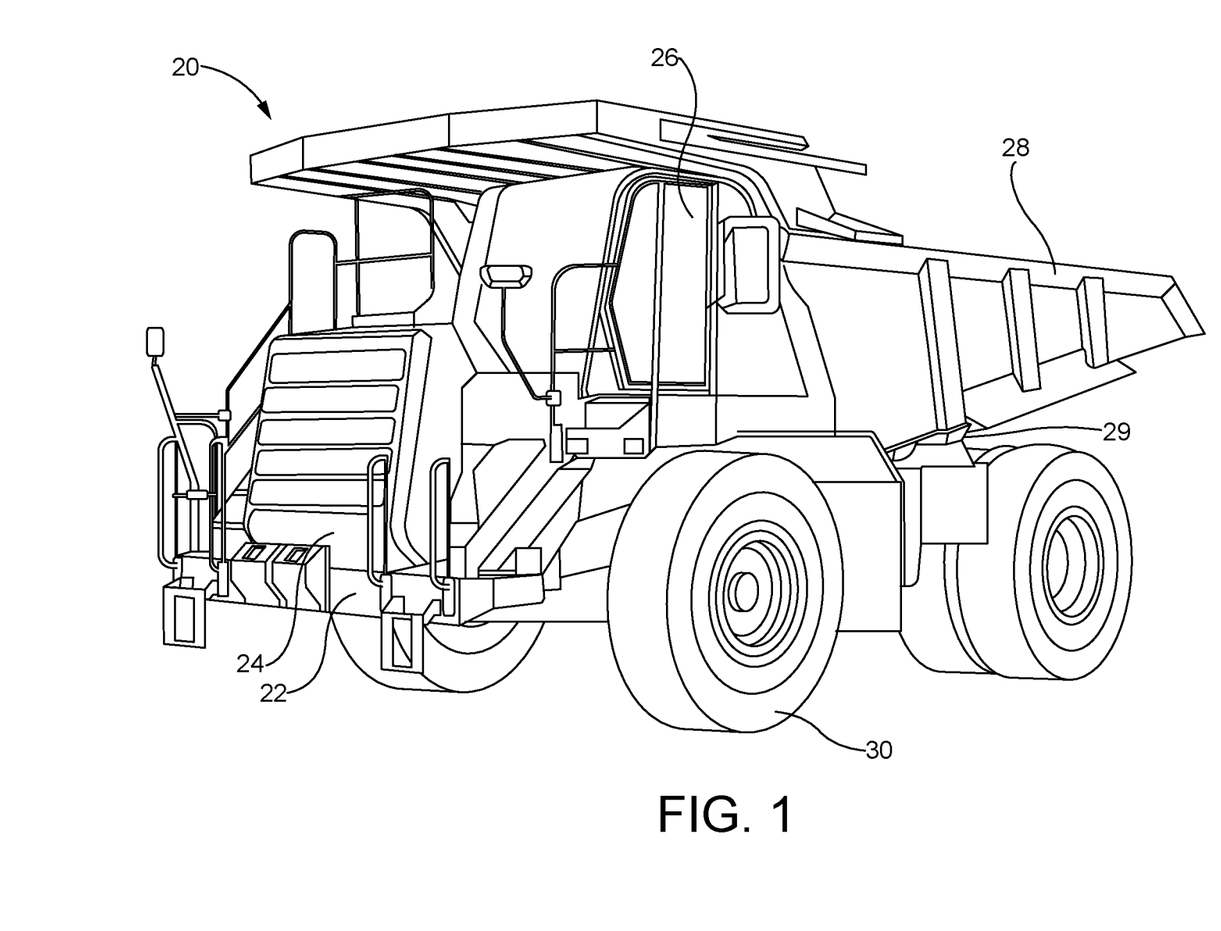
FIG. 1 is a perspective view of a machine, in accordance with an embodiment of the present disclosure.

Referring now to the drawings and with specific reference to FIG. 1, a machine 20 is shown, in accordance with certain embodiments of the present disclosure. While one non-limiting example of the machine 20 is illustrated as an off-road truck, it will be understood the machine 20 may include other types of machines such as but not limited to, an on-road truck, a track-type machine, a motor grader, industrial mining equipment, a locomotive, a marine vessel, electricity generating equipment, and any other such machine. The machine 20 may include a frame 22 configured to support an engine 24, an operator compartment 26, and a dump bed 28. The machine 20 may further include a set of ground engaging members 30 rotatably coupled to the frame 22 and driven by the engine 24 to propel the machine 20 in a direction of movement. Although the set of ground engaging members 30 are shown as wheels, other types of engagement devices, such as continuous tracks and the like, may be used. It is to be understood that the machine 20 is shown primarily for illustrative purposes to assist in disclosing features of various embodiments of the present disclosure, and that FIG. 1 may not depict all of the components of the machine 20.

Figure 2:
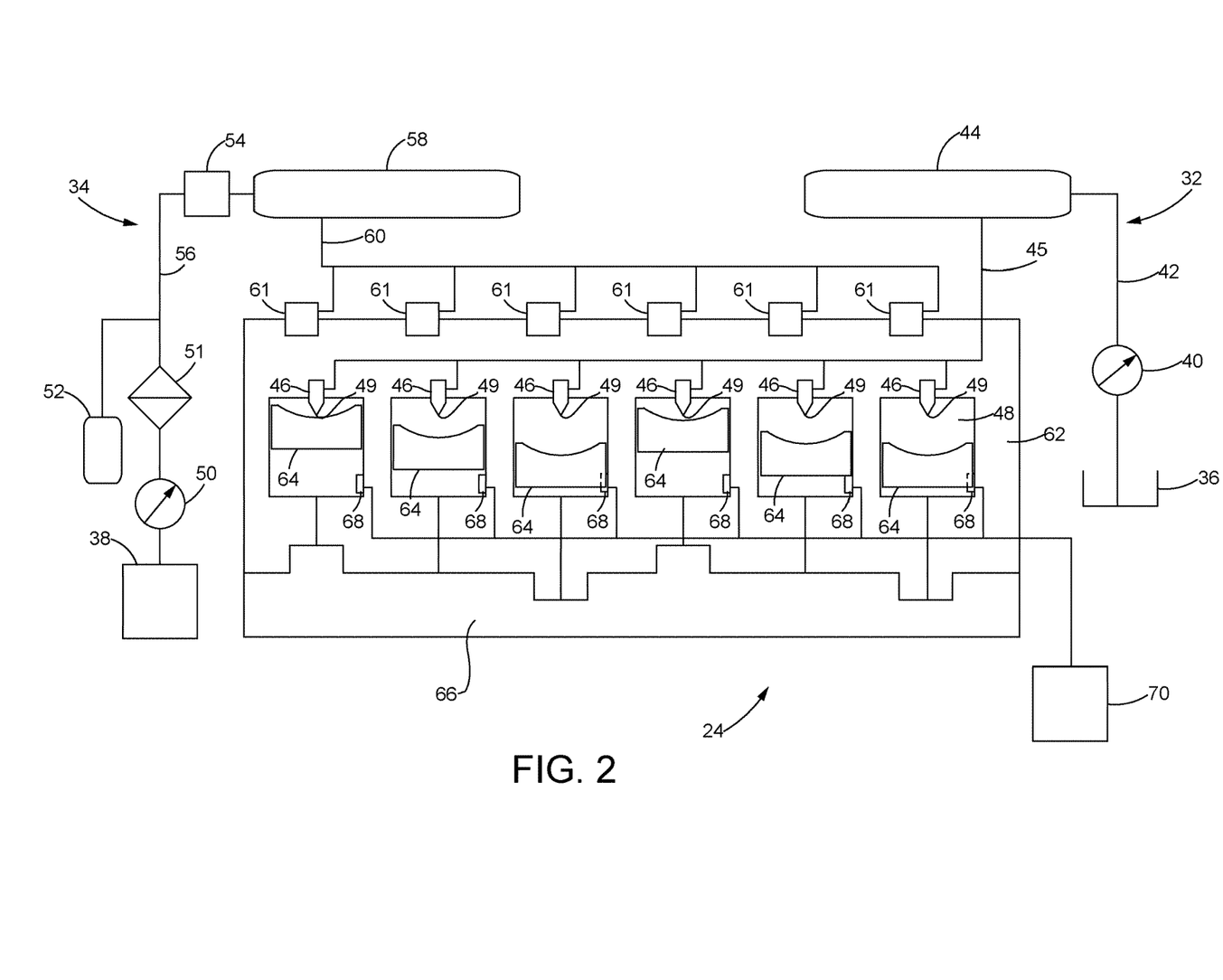
FIG. 2 is a schematic view of the engine of the machine of FIG. 1, in accordance an embodiment of the present disclosure.

Referring now to FIG. 2, with continued reference to FIG. 1, a schematic view of a portion of the engine 24 is shown. In some embodiments, the engine 24 is a dynamic gas blended (DGB) combustion engine or a dual fuel combustion engine configured to burn diesel fuel, natural gas, or other such fuel to produce the necessary power output for the machine 20 to carry out the task at hand. For example, the engine 24 may be coupled to a liquid fuel system 32 and a gaseous fuel system 34. The liquid fuel system 32 may be configured to deliver liquid fuel to the engine 24 and the gaseous fuel system 34 may be configured to deliver gaseous fuel to the engine 24. In one non-limiting example, the bulk supply of liquid fuel is diesel fuel which is stored in a liquid fuel tank 36. However, other liquid fuels such as but not limited to, di-methyl ether, biofuel, marine diesel oil or heavy fuel oil, may be used in the liquid fuel system 32. Additionally, the gaseous fuel may be natural gas, propane, hydrogen, or other such gas. Furthermore, the bulk supply of gaseous fuel may be stored at a reduced temperature in a cryogenic tank 38 in liquefied form (e.g., liquefied natural gas (LNG)).

The liquid fuel system 32 is fluidly coupled with the engine 24 and may include a pump 40 such as but not limited to, a variable displacement pump, a variable speed pump, or other such pump, a liquid fuel line 42, a liquid fuel distribution pipe or rail 44, and other known fuel system components. In some embodiments, the pump 40 is configured to pump the liquid fuel (i.e., diesel fuel) through the liquid fuel line 42 to the liquid fuel rail 44. Furthermore, the liquid fuel system 32 may be configured to distribute the liquid fuel from the liquid fuel rail 44 through a liquid fuel supply line 45 to one or more liquid fuel injectors 46 of the engine 24. In one non-limiting example, the engine 24 includes a plurality of cylinders 48 and a liquid fuel injector 46 inserted into an interior portion of each cylinder 48. Moreover, each liquid fuel injector 46 may include a nozzle 49 and the liquid fuel may be delivered through the liquid fuel supply line 45 to each liquid fuel injector 46 and injected by the nozzle 49 into each cylinder 48 of the engine 24.

Similarly, the gaseous fuel system 34 may be fluidly coupled with the engine 24. In some embodiments, the gaseous fuel system 34 may be configured to include the cryogenic tank 38, a pump 50 such as but not limited to a variable displacement pump, a variable speed pump, or other such pump, a heat exchanger 51, a gas accumulator 52, a pressure control module 54, and other known components of a fuel system. The cryogenic tank 38 holds or otherwise stores the bulk supply of gaseous fuel at a reduced temperature in the liquid state. The pump 50 may supply the gaseous fuel in liquid form (i.e., liquid natural gas (LNG)) to the heat exchanger 51 which applies heat to the LNG as it moves through the heat exchanger 51. For example, the liquefied gaseous fuel enters the heat exchanger 51 in a cryogenic (e.g., −160° C.) liquid state and exits the heat exchanger 51 in an elevated or heated (e.g., 50° C.) gaseous state. Heating the liquefied gaseous fuel may cause the liquid to experience a phase change such that liquefied gaseous fuel transitions from the liquid state into the gas state thereby producing the gaseous fuel supply. Furthermore, following the heating of the liquefied gaseous fuel, the gaseous fuel system 34 may be configured to maintain the gaseous fuel in its gas state for use by the engine 24. In some embodiments, a portion of the gaseous fuel may be stored in the gas accumulator 52 while the remainder of the gaseous fuel may be transported through a gaseous fuel line 56 to the pressure control module 54 and on to a gaseous fuel distribution pipe or rail 58. The pressure control module 54 may be configured to regulate the pressure of the gaseous fuel as it is delivered to the gaseous fuel rail 58, and other portions of the gaseous fuel system 34. In one non-limiting example, the pressure control module 54 may control or limit the gaseous fuel pressure to 150 psi or approximately 1 Mpa. Furthermore, the gaseous fuel system 34 may be configured to distribute the gaseous fuel from the gaseous fuel rail 58 through a gaseous fuel supply line 60 to a gaseous fuel admission valve 61 associated with each cylinder 48 of the engine 24.

In some embodiments, the engine 24 is configured as a dual fuel engine and each cylinder 48 may be fluidly coupled to at least one liquid fuel injector 46 and at least one gaseous fuel admission valve 61. Typically, each liquid fuel injector 46 and each gaseous fuel admission valve 61 are configured to independently inject the liquid fuel and gaseous fuel into each cylinder 48 of the engine 24. However, it will be understood that other configurations of the liquid fuel injector 46, liquid fuel system 32, the gaseous fuel admission valve 61, the gaseous fuel system 34, and other such components of the engine 24 are possible.

Further illustrated in FIG. 2, the engine 24 may be configured to include a plurality of cylinders 48 formed in an engine block 62. Each cylinder 48 may be configured with an individual liquid fuel injector 46 inserted into at least a portion of the cylinder 48. The nozzle 49 of each liquid fuel injector 46 may be positioned to inject the liquid fuel into each cylinder 48 of the engine 24. Furthermore, the engine 24 may include one or more gaseous fuel admission valves 61 which inject or fumigate the gaseous fuel into a portion of the engine 24, such as the intake manifold 90 shown in FIG. 3. Additionally, each cylinder 48 may include a piston 64 positioned to reciprocate within each of the cylinders 48 and each piston 64 may be operably coupled to a crank shaft 66 of the engine 24. In one non-limiting example, a small amount of liquid fuel and a larger amount of gaseous fuel may be injected into each cylinder 48. The small amount of liquid fuel may serve as a pilot ignition source for the larger amount of gaseous fuel, which may then undergo combustion within each cylinder 48 and cause each piston 64 to reciprocate within each cylinder 48. The stroke of each piston 64 may drive a rotation of the crank shaft 66 as each piston 64 reciprocates within the cylinder 48.

Each cylinder 48 may further include at least one cylinder sensor 68 operably coupled to and positioned within the cylinder 48 to monitor a cylinder condition. For example, the cylinder sensor 68 may be a pressure sensor such as but not limited to, a piezoresistive pressure sensor, a piezoelectric pressure sensor, a capacitive pressure sensor, an electromagnetic pressure sensor, or other known type of pressure sensor. The cylinder sensor 68 may be optimized to monitor and measure a pressure within each of the cylinders 48 of the engine 24. In some embodiments, the cylinder sensor 68 is configured to monitor and measure the condition within the cylinder 48 (i.e., cylinder pressure) and transmit a cylinder condition signal to a controller 70 such as but not limited to, an electronic controller. The controller 70 may be configured to receive the cylinder condition signal and store a cylinder condition data set based on the cylinder condition signal. Additionally, the controller 70 may analyze the cylinder condition data set and transmit a control signal based on the analysis results. In some embodiments, the controller 70 may transmit the control signal to the engine 24, the liquid fuel system 32, the gaseous fuel system 34, or other component or system of the machine 20. It will be understood that a pressure sensor is provided as one non-limiting example of the cylinder sensor 68 and the cylinder sensor 68 may include another type of sensor that is configured to monitor and measure an alternative condition of the cylinder 48.

Figure 3:
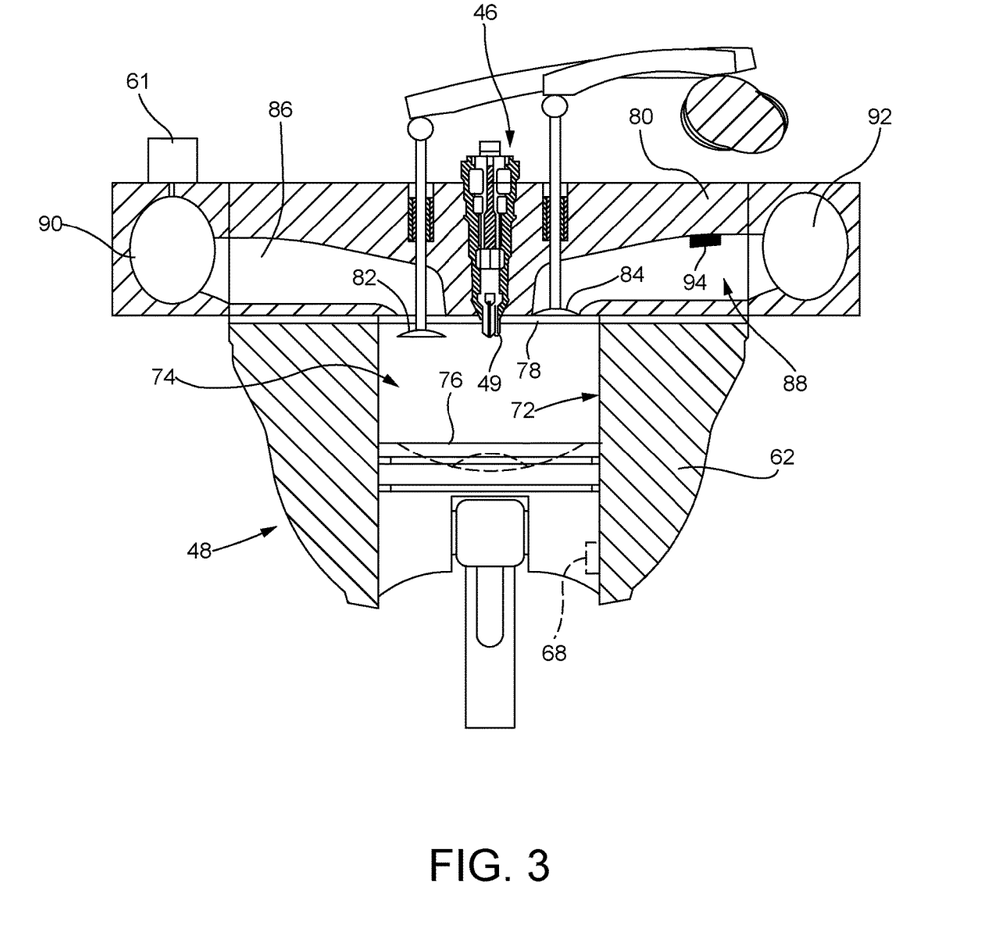
FIG. 3 is a cross-sectional view of one cylinder of the engine of FIG. 2, in accordance with an embodiment of the disclosure.

Referring to FIG. 3, with continued reference to FIGS. 1-2, a cross-section of an individual cylinder 48 and liquid fuel injector 46 is shown. Furthermore, while a single liquid fuel injector 46 is shown partially extending into the cylinder 48, it will be understood that alternative embodiments may incorporate more than one fuel injector 46 positioned in each cylinder 48. The cylinder 48 includes a cylinder bore 72 that is formed in the engine block 62 and a cylinder head 80. The cylinder bore 72 is sized such that the piston 64 is slidably engaged with the cylinder bore 72 as the piston 64 reciprocates within the cylinder 48. The cylinder 48 has a cylinder volume 74 which is defined by the cylinder bore 72, a top surface 76 of the piston 64, and a surface 78 of the cylinder head 80. The cylinder volume 74 may be variable such that the cylinder volume 74 changes as the piston 64 reciprocates within the cylinder bore 72. Moreover, in some embodiments, the cylinder 48 includes the cylinder sensor 68 that is positioned within the cylinder volume 74. As further illustrated in FIG. 3, the cylinder sensor 68 may be incorporated along the cylinder bore 72 and positioned within the cylinder volume 74. However, other positions of the cylinder sensor 68 are possible. The cylinder sensor 68 may be configured to monitor and measure one or more conditions of the cylinder volume 74 such as but not limited to, the pressure of the cylinder volume 74, although the monitoring and measuring of other cylinder conditions, or even a plurality of cylinder conditions, may be possible.

Furthermore, each cylinder 48 may include one or more valves which fluidly connect one or more pathways into and out of the cylinder 48 and cylinder volume 74. For example, the cylinder may have at least one intake valve 82 and at least one exhaust valve 84 which open and close to fluidly connect and disconnect the one or more pathways into and out of the cylinder 48. In one non-limiting example, the intake valve 82 may be selectively actuated to open and/or close an intake pathway 86 formed within the cylinder head 80 and fluidly connect the cylinder volume 74 with an intake manifold 90. Furthermore, the intake manifold 90 of each cylinder 48 may be operably coupled to a gaseous fuel admission valve 61 (FIG. 2) which may be selectively operated to inject or fumigate the gaseous fuel into the intake pathway 86. The intake valve 82 may be actuated such that a portion of the intake valve 82 extends or otherwise opens into the cylinder volume 74 and fluidly connects the gaseous fuel admission valve 61, the intake manifold 90, and the intake pathway with the cylinder volume 74. Additionally, the exhaust valve 84 may be selectively actuated to open and/or close an exhaust pathway 88 formed within the cylinder head 80 and fluidly connects the cylinder volume 74 with an exhaust manifold 92. Moreover, the exhaust valve 84 may be actuated such that the exhaust manifold 92 and exhaust pathway 88 are closed off from the cylinder volume 74. Alternatively, the intake valve 82 and the exhaust valve 84 may be actuated such that both of the intake pathway and the exhaust pathway 88 are closed off from the cylinder volume 74.

In some embodiments, the exhaust pathway 88 may include at least one exhaust pathway sensor 94 configured to monitor and measure a condition of the exhaust pathway 88.

The exhaust pathway sensor 94 may be a temperature sensor configured to monitor and measure the temperature of the exhaust flow from the cylinder volume 74 of each cylinder 48 through the exhaust pathway 88 to the exhaust manifold 92. Furthermore, the exhaust pathway sensor 94 may be configured to monitor and measure the condition within the exhaust pathway 88 (i.e., temperature) and transmit an exhaust pathway condition signal to the controller 70 (FIG. 2). The controller 70 may be configured to receive the exhaust pathway condition signal, similarly to the cylinder condition signal, and store an exhaust pathway data set based on the transmitted exhaust pathway condition signal. Additionally, the controller 70 may analyze the exhaust pathway data set and transmit at least one control signal based on the results of the exhaust pathway data set analysis. In some embodiments, the controller 70 may transmit at least one control signal to the engine 24, the liquid fuel system 32, the gaseous fuel system 34, or other component or system of the machine 20. It will be understood a temperature sensor is provided as one non-limiting example and the exhaust pathway sensor 94 may include additional and/or alternative sensors configured to monitor and measure a condition of the exhaust pathway 88. Moreover, the intake pathway 86 may include one or more sensors (not shown) that are in electronic communication with the controller 70 (FIG. 4) and the intake pathway sensors (not shown) positioned in the intake pathway 86 may be configured to monitor and measure an operational condition of the intake pathway 86 such as but not limited to, an intake pressure, intake pathway 86 temperature, or other such condition.

Figure 4:
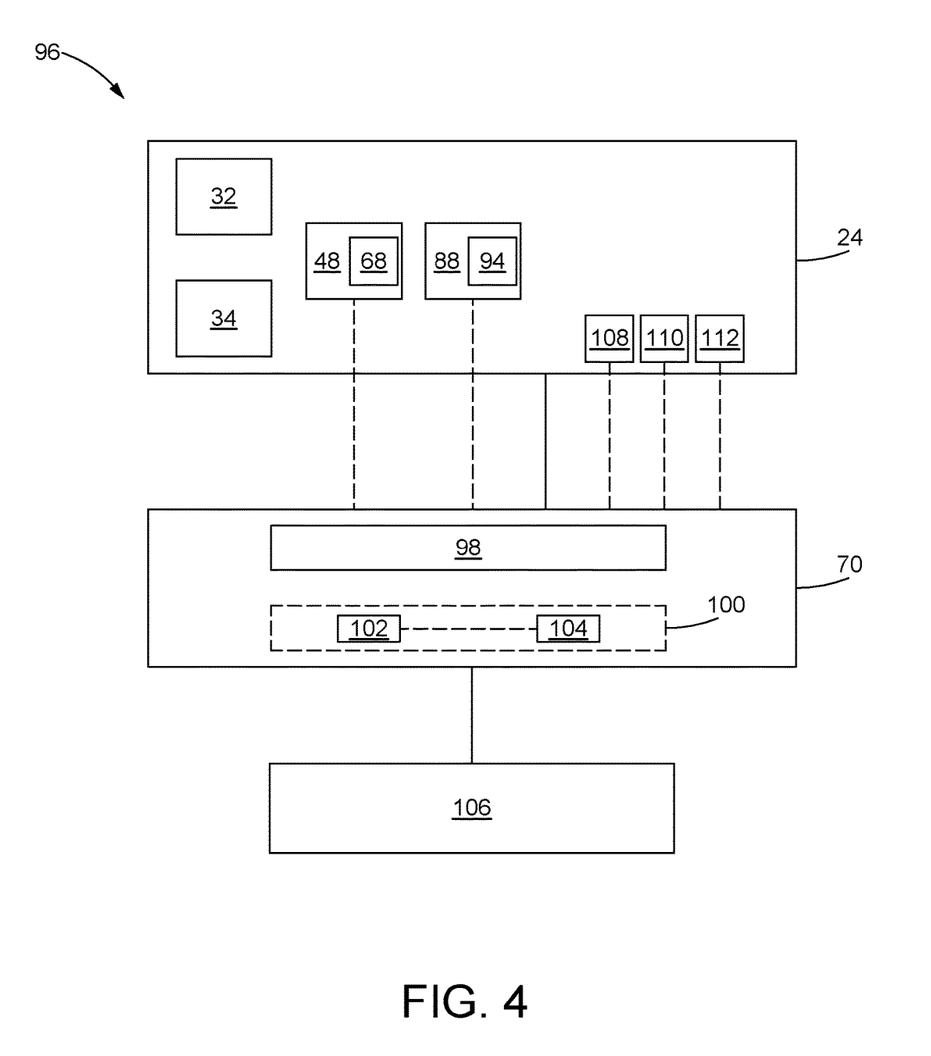
FIG. 4 is a schematic diagram of a control system for controlling machine of FIG. 1, in accordance with an embodiment of the present disclosure.

Referring to FIG. 4 with continued reference to FIGS. 1-3, the machine 20 may include a control system 96 configured to control and operate the engine 24, the ground engaging members 30, the liquid fuel system 32, the gaseous fuel system 34, and other systems and components of the machine 20. The control system 96 may include the controller 70 which is programmed to receive data signals and other information from a variety of input devices such as but not limited to, the plurality of cylinder sensors 68, exhaust pathway sensors 94, and other sensors and input devices of the machine 20. In some embodiments, the controller 70 may include software or other executable data file used to analyze and process the data signals and other information received from the plurality of cylinder sensors 68, exhaust pathway sensors 94, and other such sensors and input devices. Based on the analysis performed on the received data signals and other collected input information, the controller 70 may output a plurality of commands and control signals to the engine 24, the liquid fuel system 32, the gaseous fuel system 34, and other systems and components of the machine 20. Furthermore, while one controller 70 is illustrated, it will be understood that the control system 96 may incorporate a plurality of controllers 70 configured to control and operate systems and components of the machine 20.

The controller 70 may include a microprocessor 98 for executing the software, programs, and/or algorithms that are configured to control, monitor, and measure the various functions of the machine 20. Moreover, the microprocessor 98 may include a memory module 100 which further includes read only memory (ROM) 102, configured to provide storage for the software, programs, algorithms, and data. Additionally, the memory module 100 may include random access memory (RAM) 104, which provides storage space for the data generated during the execution of the software, programs, and/or algorithms. While the microprocessor 98 is illustrated in FIG. 4, it will be appreciated that other components such as but not limited to, a microcontroller, an application specific integrated circuit (ASIC), or other electronic device may be used to control and operate the machine 20.

The controller 70 may be housed within the operator compartment 26 (FIG. 1), on the engine 24, or other such location of the machine 20. Additionally or alternatively, a plurality of controllers 70 may be located in multiple locations of the machine 20 and each controller 70 may be electronically coupled to one another such that data and information is transmitted and received by each controller 70. In some embodiments, the controller 70 may be operably coupled to an input/output device 106, and an operator of the machine 20 may use the input/output device 106 to access the controller 70. For example, the input/output device 106 may be configured to allot the operator to input or execute commands to the controller 70 through a keyboard, a mouse, a dial, a button, a joystick, a touch screen, a microphone, or other known input device. Additionally, data and other information provided by the controller 70 may be output to a display device such as but not limited to, a monitor, a speaker, a video screen, or other visual/audio display device capable of providing the controller 70 output to the operator. In some embodiments, the input/output device 106 may be coupled to the controller 70 through a wired connection and the input/output device 106 is adjacently positioned to the controller 70 in the operator compartment 26 of the machine 20. Alternatively, the input/output device 106 may be coupled to the controller 70 through a wireless communication network such as, a Bluetooth network, a near-field communication network, a radio frequency communication network, a computer data network, a Wi-Fi data network, a cellular data network, a satellite data network, or other such data communication network. Furthermore, the input/output device 106 may be a handheld mobile device that is wirelessly connected to the controller 70 such as but not limited to, a tablet computer, a smart phone, a cellular phone, a laptop computer, or other such mobile electronic device. As a result, the operator and the input/output device 106 may be remotely located from the controller 70 and the operator may be able to remotely control the machine 20 from a location other than the operator compartment 26. Moreover, a supervisor, planner, mechanic, or other interested personnel may be able to use the remotely located input/output device 106 to access the controller 70 to monitor and view the activity of the machine 20.

During operation of the machine 20, the control system 96 may be configured to monitor, control and adjust the operation several systems of the machine 20. In some embodiments, the engine 24 may be configured as a dual fuel engine which uses both the liquid fuel and the gaseous fuel to operate the engine 24 in one or more operational modes. In one operational mode, the liquid fuel may be used to provide a pilot fuel ignition source to ignite or otherwise create combustion of the gaseous fuel, which serves as the main fuel source for power generation by the engine 24. As a result, a small amount of liquid fuel (i.e., pilot fuel) and a larger amount of gaseous fuel (i.e., bulk fuel) is injected into each cylinder 48 by the respective liquid fuel injector 46 and the gaseous fuel admission valve 61. However, in some cases it may be possible to increase the amount of liquid fuel and decrease the amount of gaseous fuel supplied to the engine 24.

For example, during operation the machine 20 may travel down a steep incline while entering into a work site. In some cases, the machine 20 may coast or motor down the incline, and as a result the engine 24 may be controlled to supply a reduced amount of power. During the motoring and/or coasting condition, the engine 24 may consume very little or even zero amount of fuel. As a result, when a substantially reduced amount of liquid fuel is injected into each cylinder 48 the residual combustion gas or gaseous fuel present in the cylinder 48 may leak or backflow into the liquid fuel injector 46. The combustion gas and/or gaseous fuel may build up in the cylinder 48 and the nozzle 49 portion of the liquid fuel injector 46, whereby at the end of the motoring and/or coasting condition a sufficient amount of gas may have accumulated in the cylinder 48 and nozzle 49 of the fuel injector 46 such that an insufficient amount of liquid fuel (i.e., pilot fuel) is supplied and ignition of the gaseous fuel does not occur. Such a condition may cause a reduced or no combustion event in the affected cylinder 48, sometimes referred to as a "dead" cylinder. Furthermore, the "dead" cylinder or mis-fire condition of the affected cylinder 48 may persist until a sufficient amount of liquid fuel is injected into the cylinder 48 or the accumulated gas is purged or otherwise removed from the cylinder 48 and nozzle 49 of the liquid fuel injector 46

The control system 96 may be configured to monitor and control the liquid fuel system 32 and the gaseous fuel system 34 in order to optimize the performance and operation of the engine 24 of the machine 20. More specifically, the control system 96 may be programmed to monitor and diagnose problems that arise during motoring and other operating conditions of the engine 24. In one non-limiting example, the engine 24 may include a plurality of cylinders 48 (FIG. 2) and each cylinder 48 may have at least one cylinder sensor 68 to monitor the operation of the engine 24. For example, each cylinder 48 may be configured with at least one cylinder sensor 68 positioned within the cylinder volume 74 (FIG. 3) and configured or otherwise adjusted to monitor at least one condition of the cylinder 48. In one non-limiting example, each of the cylinder sensors 68 may be a pressure sensing device configured to continuously measure and monitor the pressure within the cylinder volume 74 of each cylinder 48. Moreover, the cylinder sensors 68 may transmit a cylinder condition signal to the controller 70.

During operation of the machine 20, the controller 70 may receive a cylinder condition signal from each of the cylinder sensors 68 to indicate the operating state (i.e., normal or abnormal) of the engine 24, the liquid fuel system 32, the gaseous fuel system 34, and other systems and components of the machine 20. More specifically, each of the cylinder sensors 68 may be configured to monitor and measure the pressure of the cylinder volume 74. The controller 70 may receive the measured pressure of each cylinder volume 74 from the cylinder sensors 68 and compare the received measured pressures with expected pressure values that are stored in the memory module 100 of the controller 70. This comparison of the measured cylinder pressure with the expected pressure values may allow the controller 70 to detect an abnormal condition such as but not limited to, the accumulation of combustion gas or gaseous fuel in the cylinder 48 and nozzle 49 of the liquid fuel injector 46 that may occur during a motoring or coasting condition of the machine 20. For example, if combustion gas and/or gaseous fuel leaks into the cylinder 48 during the motoring or coasting, the cylinder sensor 68 may measure a pressure in the cylinder volume 74 that is higher than the expected pressure and as a result, the controller 70 may determine that the engine 24 is operating in an abnormal condition.

Additionally, the controller 70 may receive an exhaust pathway condition signal from one or more exhaust pathway sensors 94 positioned within each exhaust pathway 88 leading away from each cylinder 48. Similar to the cylinder condition signal sent by the cylinder sensors 68, the exhaust pathway condition signal may be used to indicate the operating state (i.e., normal or abnormal) of the engine 24, the liquid fuel system 32, the gaseous fuel system 34 and other systems and components of the machine 20. In some embodiments, each exhaust pathway sensor 94 may be a temperature sensing device and configured to monitor and measure the temperature of the exhaust moving through the exhaust pathway 88. The controller 70 may receive the measured temperature of each exhaust pathway 88 from the exhaust pathway sensors 94 and compare the received measured temperatures with expected temperature values that are stored in the memory module 100 of the controller 70. This comparison of the measured exhaust pathway 88 temperature with the expected temperature values may allow the controller 70 to detect an abnormal condition such as but not limited to, the accumulation of combustion gas or gaseous fuel in the cylinder 48 and nozzle 49 of the fuel injection that may occur during a motoring or coasting condition of the machine 20. For example, if combustion gas or gaseous fuel leaks into the cylinder 48 during the motoring or coasting, the exhaust pathway sensor 94 may measure a temperature in the exhaust pathway 88 that is outside of the expected operational temperature range.

In some embodiments, the controller 70 may receive both the cylinder condition signal and the exhaust pathway condition signal from each of the cylinder sensors 68 and exhaust pathway sensors 94 respectively. As a result, the controller 70 may use both of the received cylinder condition signals (i.e., measured pressure) and the received exhaust pathway condition signals (i.e., measured temperature) to monitor and control a plurality of operation conditions of the engine 24, the liquid fuel system 32, the gaseous fuel system 34, and other systems and components of the machine 20. Alternatively, the controller 70 may use only one of the received cylinder condition signals or the received exhaust pathway condition signals (i.e., measured pressure or measured temperature) to monitor and control the operation condition of the engine 24, the liquid fuel system 32, the gaseous fuel system 34, and other systems and components of the machine 20.

The controller 70 may be further configured to transmit control and command signals based off the performed analysis of the received cylinder condition and exhaust pathway condition signals. For example, the detected abnormal operating condition may identify and alert the operator of the machine 20 to an abnormal operating condition of one or more cylinders 48 of the engine 24 due to an accumulation of combustion gas and/or gaseous fuel within the cylinder volume 74. In response, the controller 70 may send a control signal to the liquid fuel system 32 to increase the flow or injection of liquid fuel into one or more cylinders 48 to purge the accumulated combustion gas and/or gaseous fuel. Additionally, the controller 70 may send a signal to the gaseous fuel system 34 to reduce or cut of the flow or injection of gaseous fuel into one or more cylinders 48 to ensure there is no gaseous fuel being injected into the cylinder 48 while the accumulated combustion gas and/or gaseous fuel is being purged. It will be also understood that in some cases the operator of the machine 20 may be able to address an abnormal operating condition by manually activating the controller 70 to send one or more control signals to the liquid fuel system 32, the gaseous fuel system 34 and other systems and components of the machine 20.

In some embodiments, the controller 70 may receive signals and data collected by a variety of additional sensors associated with the operation of the engine 24 and other systems of the machine 20. For example, the engine 24 may include an engine speed sensor 108 which monitors and measures an output speed of the engine 24. The speed of the engine 24 may be manually controlled by the operator of the machine 20. Alternatively, the speed of the engine 24 may be automatically controlled by commands transmitted by the controller 70 and received by the engine speed sensor 108. Additionally, the engine 24 may include one or more engine load sensor 110 which transmit a load signal to the controller 70. In some embodiments, the controller 70 may utilize the load signal to determine the required liquid and gaseous fuel metering by the liquid fuel system 32 and the gaseous fuel system 34 to optimize combustion in the engine 24 in order to produce the required power for the machine 20. Furthermore, the engine 24 may include an engine timing sensor 112 operatively coupled to the crank shaft 66. The engine timing sensor 112 monitors the position of the crank shaft 66 and transmits a timing signal to the controller 70. In some embodiments, the controller 70 may utilize the timing signal from the engine timing sensor 112 to assist in metering the liquid fuel and gaseous fuel injection into each cylinder 48 of the engine 24. Additionally, the timing signal may assist the controller 70 to determine ignition timing during the liquid and gaseous fuel combustions and assist in any other known parameters of the engine 24.

Additionally, the memory module 100 of the controller 70 may be configured to save input data received from one or more cylinder sensor 68, exhaust pathway sensor 94, engine speed sensor 108, engine load sensor 110, engine timing sensor 112, and other such input device to create a historical data set of the machine 20. Moreover, the controller 70 may save or log the abnormal operating conditions detected and the corrective action control signals transmitted to the engine 24, liquid fuel system 32, gaseous fuel system 34 and other systems and components of the machine 20 and each abnormal operating event and corrective action event may be included in the historical data set. The control system 96 may be further configured to analyze the historical data set saved on the controller 70 to identify any operational trends or other signals which may allow the control system 96 to predict when abnormal operating conditions may occur. Furthermore, the control system 96 may be able to produce a preventative maintenance report based on the logged activity and provide recommended service and/or required maintenance to be performed on the machine 20.

INDUSTRIAL APPLICABILITY

In general, the present disclosure may find application in many industries, including but not limited to, mining, construction, agriculture, and other such industries. In some embodiments, the engine 24 of the machine 20 includes a liquid fuel system 32 and a gaseous fuel system 34 configured to respectfully supply liquid and gaseous fuel to the engine 24. During operation of the machine 20, the liquid fuel (i.e., diesel fuel) may be supplied in small amounts to an injection ignition pilot to ignite the gaseous fuel (i.e., natural gas), which serves as the main fuel for power generation by the engine 24. Additionally, the machine 20 may be configured with the control system 96 to monitor and control the engine 24, the liquid fuel system 32, the gaseous fuel system 34, and other systems and components of the machine 20. More specifically, the control system 96 may be used to monitor and analyze the operating parameters of the engine 24 and to transmit control signals to provide a corrective action if an abnormal operating condition of the engine 24, liquid fuel system 32, gaseous fuel system 34, or other system or component of the machine 20 is detected. Furthermore, the operating parameters monitored and analyzed by the control system 96 may additionally be used to optimize future performance of the engine 24, diagnose potential malfunction conditions of the engine 24, provide maintenance recommendations for components of the engine 24, and other such diagnostic functions.

Incorporating the control system 96, as described in the present disclosure, may provide significant operational performance of the engine 24 as well as safety improvements during the operation of the machine 20. In some cases, the machine 20 may be deployed at a site having an uneven terrain including steep downward grades. During a decent down a steep grade, the engine 24 may operate in a motoring condition where a reduced amount or no fuel is injected and/or consumed by the engine 24. More specifically, the lack of liquid fuel being injected into the liquid fuel injector 46 may allow residual combustion gas and/or gaseous fuel to backflow or leak into the nozzle 49 of the liquid fuel injector 46. This leak of gas or air may cause an abnormal operating condition such as but not limited to, a misfire of one or more cylinders 48 or other known abnormal operating condition of the engine 24. As a result, the misfire of one or more cylinders 48 may cause excess wear on various components of the engine 24, thereby requiring more frequent maintenance and increased down time of the machine 20. Additionally, the misfire of one or more cylinders 48 and other abnormal operating conditions may decrease the overall power output by the engine 24. In some situations, the decreased power output may increase the time to complete the task at hand, decrease fuel efficiency, and place increased stress on other systems and components of the engine 24. Finally, the misfire of one or more cylinders 48 may cause the machine 20 to hesitate or even stall and bring the machine 20 to a sudden stop. Such hesitation and/or stalling of the machine 20 may cause a significant safety concern due to the possibility of other machines and equipment colliding with the malfunctioning machine 20.

Figure 5:
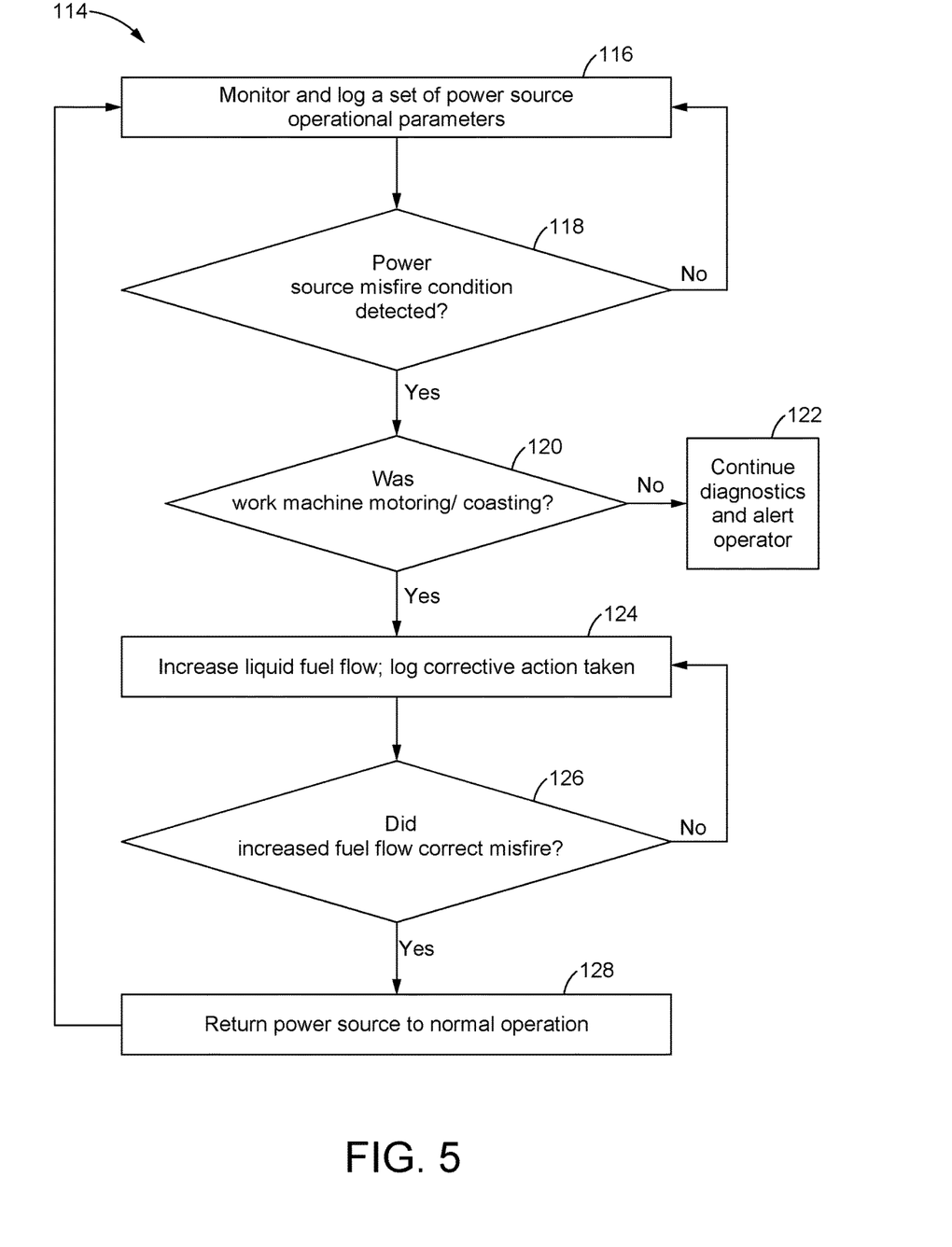
FIG. 5 is a flow chart of a method executed by the control system of FIG. 4 for mitigating abnormal operating conditions and providing corrective action to the machine of FIG. 1, in accordance with an embodiment of the present disclosure.

FIG. 5, with continued reference to FIGS. 1-4, illustrates a method 114 for monitoring and providing mitigation of cylinder 48 misfire in the engine 24. In a first block 116 of the method 114, the control system 96 may be selected to monitor a set of operational parameters of the engine 24, the liquid fuel system 32, the gaseous fuel system 34 and other systems and components of the machine 20. For example, the controller 70 may be in electronic communication with one or more sensors such as but not limited to, the cylinder sensor 68, the exhaust pathway sensor 94, the engine speed sensor 108, the engine load sensor 110, the engine timing sensor 112, and any other known sensors of the machine 20. The control system 96 may be configured to collect and log a data set of the received operational parameters from the cylinder sensor 68, exhaust pathway sensor 94, engine speed sensor 108, engine load sensor 110, engine timing sensor 112 and other known sensors. In one non-limiting example, the data set is stored in the memory module 100 of the controller 70. However, the data set may be stored in alternative locations of the control system 96 as well.

A cylinder sensor 68 may be positioned in each cylinder 48 of the engine 24 and configured to monitor and measure an operational parameter of the engine 24. In one non-limiting example, each cylinder sensor 68 may be a pressure sensing device configured to monitor and measure the cylinder volume 74 pressure of each cylinder 48. The cylinder sensor 68 may be further configured to transmit the cylinder volume 74 pressure, or other measured operational parameter, to the controller 70. Additionally or alternatively, an exhaust pathway sensor 94 may be positioned in the exhaust pathway 88 of each cylinder 48 of the engine 24 and configured to monitor and measure an additional or alternative operational parameter of the engine 24. Moreover, each exhaust pathway sensor 94 may be configured as a temperature sensing device which may monitor and measure the temperature of the exhaust flowing out of each cylinder 48 through the exhaust pathway 88. Similarly to the cylinder sensor 68, the exhaust pathway sensor 94 may be configured to transmit the exhaust pathway 88 temperature, or other measured operational parameter, to the controller 70.

The controller 70 may receive and analyze the cylinder volume 74 pressure and/or the exhaust pathway 88 temperature to determine an operational state of the engine 24. In one non-limiting example, the controller 70 may compare all of the measured cylinder volume 74 pressures and all of the measured exhaust pathway 88 temperatures with a set of expected cylinder volume 74 pressures and expected values for the exhaust pathway 88 temperatures respectively. The comparison or analysis on both the cylinder volume 74 pressure and the exhaust pathway 88 temperature may detect an abnormal operational condition of the engine 24 such as but not limited to, the misfire of one or more cylinders 48 of the engine 24. Alternatively, the controller 70 may be configured to compare only all of the measured cylinder volume 74 pressures with the set of expected cylinder volume 74 pressures or all of the measured exhaust pathway 88 temperatures with the set of expected exhaust pathway 88 temperature values. As a result, in some cases the misfire of one or more cylinder 48 of the engine 24 may be detected by the controller 70 analysis of only one or the cylinder volume 74 pressure or the exhaust pathway 88 temperature.

Additionally, the measured and analyzed results of the cylinder volume 74 pressures and exhaust pathway 88 temperatures may be stored in the memory module 100 of the controller 70. However, the controller 70 may store the collected data in other locations as well such as but not limited to, an external storage device, an internet based storage location, or other known data storage device. Moreover, the stored cylinder volume 74 pressure data and exhaust pathway 88 temperature data may further be used by the controller 70 to predict future performance conditions of the engine 24. For example, the controller 70 may include software or other algorithms that can use the stored cylinder volume 74 pressure and exhaust pathway 88 temperature data to predict when the engine 24 may experience a performance degradation and/or malfunction.

In a next block 118 the controller 70 may make a determination of whether a misfire condition of one or more cylinders 48 of the engine 24 was detected based on the analysis of the cylinder volume 74 pressure data and/or the exhaust pathway 88 temperature data. For example, during a cylinder 48 misfire a different (i.e., higher or lower) cylinder volume 74 pressure may be measured by one or more of the cylinder sensors 68 to signal that a misfire has occurred. Additionally or alternatively, a different (i.e., higher or lower) exhaust pathway 88 temperature may be measured by one or more of the exhaust pathway sensors 94 to signal that a misfire has occurred. If a misfire or other abnormal condition of the engine 24 is not detected then the control system 96 will continue to monitor the engine 24 operation and log the set of collected engine operational parameters.

However, if the control system 96 detects the occurrence of a misfire in one or more cylinders 48 then in a next block 120 the controller 70 may attempt to determine if the machine 20 was in a motoring condition or coasting down an incline or steep grade. In one non-limiting example, the controller 70 may reference the data collected by the engine speed sensor 108, engine load sensor 110, and engine timing sensor 112 to help make the determination whether the machine 20 was in a motoring or coasting condition. Such a determination may be important because it may provide an indication as to why the misfire in one or more of the cylinders 48 occurred. During motoring or coasting of the machine 20, a reduced or zero amount of liquid and gaseous fuel may be injected into the cylinders 48. The lack of fuel being injected into the cylinder 48 may allow combustion gas and/or gaseous fuel to leak or backflow into the cylinder 48 and nozzle 49 of the fuel injector 46. If a sufficient amount of combustion gas and/or gaseous fuel accumulates in the nozzle 49 the misfire or ignition failure of the cylinder 48 may occur.

In a next block 122, if it is determined that the machine 20 was not in a motoring or coasting condition then the control system 96 will continue with the diagnostics of the machine 20 and alert the operator of the abnormal condition. However, if it is determined that the machine 20 was in a motoring or coasting condition, then in a next block 124 the control system 96 may attempt to mitigate or provide a corrective action for the detected cylinder 48 misfire. In one non-limiting example, the controller 70 may transmit a control signal to the liquid fuel system 32 to increase the injection or flow of liquid fuel through the liquid fuel injector 46 of the cylinder 48 where the misfire was detected. Alternatively, the controller 70 may send the control signal such that the liquid fuel system 32 increases the injection or flow of liquid fuel through each liquid fuel injector 46 of each cylinder 48 of the engine 24. The increased injection or flow of liquid fuel may help purge or otherwise expel the accumulated combustion gas and/or gaseous fuel in the cylinder 48 and nozzle 49 of the liquid fuel injector 46 and correct or eliminate the misfire condition detected in one or more cylinders 48 of the engine 24. Additionally, the controller 70 may transmit a control signal to the gaseous fuel system 34 to reduce or stop injection of the gaseous fuel while purging the accumulated combustion gas and/or gaseous fuel from the cylinder 48.

In a next block 126, the controller 70 may determine whether the increased flow of liquid fuel was successful in correcting the misfire condition detected in the one or more cylinders 48 of the engine 24. To make such a determination, the controller 70 may further analyze the cylinder volume 74 pressure and/or the exhaust pathway 88 temperature that is measured by the cylinder sensors 68 and exhaust pathway sensors 94 respectively. However, other known operational parameters may be additionally or alternatively used by the control system 96 to determine whether the misfire condition was corrected or not. If the misfire condition is determined to not have been corrected, then the control system 96 may continue to purge the accumulated combustion gas and/or gaseous fuel from the cylinder 48 and nozzle 49 of the liquid fuel injector 46. Additionally, the control system 96 may notify the operator of the machine 20 of the misfire condition and the operator may assist or manually control the control system 96 in supplying a corrective action to mitigate the misfire condition. In a next block 128, if it was determined that the increased liquid fuel flow or other such corrective action was successful in mitigation of the misfire condition then the control system 96 will return the machine 20 to the normal operational mode and the control system 96 will continue to monitor and measure operational parameters of the engine 24.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A control system for a dual fuel engine having a liquid fuel supply and a gaseous fuel supply, the control system comprising:
   at least one pressure sensor operably coupled to a cylinder of the dual fuel engine and configured to monitor and measure a cylinder pressure and transmit a cylinder pressure signal;
   an engine speed sensor configured to monitor an output speed of the dual-fuel engine and transmit an engine speed signal;
   an electronic controller communicably coupled with the at least one pressure sensor and the speed sensor, the electronic controller configured to:
      receive the cylinder pressure signal and determine whether the cylinder is operating in a misfire condition based on the received cylinder pressure signal;
      receive the engine speed signal and determine whether the dual-fuel engine is in a motoring condition, wherein the motoring condition is when a machine which is propelled by the dual fuel engine is propelled down a grade by gravity; and
      wherein, when the cylinder pressure is above a pre-determined pressure range the electronic controller determines that the cylinder is operating in the misfire condition and when the engine speed is below a pre-determined threshold the electronic controller determines the dual fuel engine is operating in a motoring condition, and the electronic controller sends a control signal to increase an injection of the liquid fuel supply into the cylinder to purge the cylinder of an amount of backflow gas from the cylinder and a fuel injector nozzle during the determined motoring condition to lower the cylinder pressure within the pre-determined pressure range.

2. The control system of claim 1, further comprising a temperature sensor operably coupled to an exhaust port and configured to measure an exhaust temperature of the cylinder, the temperature sensor further configured to transmit an exhaust temperature signal to the electronic controller, and wherein the electronic controller is programmed to determine whether the exhaust temperature is within a pre-determined temperature range and transmit the control signal based on the exhaust temperature.

3. The control system of claim 2, wherein when at least one of the cylinder pressure and the exhaust temperature is determined to be outside of the respective pre-determined pressure range and the pre-determined temperature range, and wherein the electronic controller is programmed to transmit a corrective action control signal to each of the liquid fuel supply and the gaseous fuel supply such that the amount of liquid fuel supplied being increased and an amount of gaseous fuel supplied being reduced in order to purge the cylinder and the fuel injector nozzle.

4. The control system of claim 3, wherein the corrective action control signal commands the liquid fuel supply to inject the amount of liquid fuel into the cylinder as long as at least one of the cylinder pressure and the exhaust temperature is determined outside of the respective pre-determined pressure range and the pre-determined temperature range.

5. The control system of claim 1, wherein the electronic controller is configured to store a cylinder condition signal to create a cylinder condition log and the electronic controller is programmed to analyze the cylinder condition log to predict a future cylinder condition and a future maintenance requirement of the dual fuel engine.

6. The control system of claim 1, wherein, when the dual fuel engine is determined to be operating in the motoring condition the electronic controller-activates a pre-emptive motoring operation mode.

7. A method of operating a dual fuel engine, the method comprising:
   supplying a liquid fuel into a cylinder of the dual fuel engine;
   supplying a gaseous fuel into the cylinder of the dual fuel engine;
   sensing a cylinder pressure with at least one pressure sensor operably coupled to the cylinder;
   sensing an output speed of the dual-fuel engine with an engine speed sensor;
   transmitting a cylinder pressure signal, engine speed signal, engine load signal, and timing signal to an electronic controller configured to analyze the cylinder pressure signal and engine speed signal;
   determining whether the cylinder is above a pre-determined pressure range and the cylinder is operating in a misfire condition based on the cylinder pressure signal;
   determining whether the dual-fuel engine is operating in a motoring condition based on the output speed, engine load, and crank shaft position, wherein the motoring condition is when a machine which is propelled by the dual fuel engine is propelled down a grade by gravity;
   transmitting a control signal from the electronic controller commanding to increase injection of a supply of liquid fuel to the cylinder when the electronic controller determines that the cylinder pressure is above the pre-determined pressure range and the cylinder is operating in the abnormal operating condition during a determined motoring condition; and
   purging an amount of an backflow gas from the cylinder and a fuel injector nozzle during the determined motoring condition with the increased supply of liquid fuel to lower the cylinder pressure within the pre-determined pressure range.

8. The method of claim 7, further comprising:
   sensing an exhaust port temperature a with a temperature sensor operably coupled to an exhaust port;
   transmitting an exhaust temperature signal to the electronic controller to analyze the exhaust temperature signal; and determining whether the exhaust port temperature is within a pre-determined temperature range and transmitting the control signal based on the cylinder pressure.

9. The method of claim 8, wherein when at least one of the cylinder pressure and the exhaust temperature is determined outside of the respective pre-determined pressure range and the pre-determined temperature range, and operating the dual fuel engine includes transmitting a corrective action control signal to each of a liquid fuel supply and a gaseous fuel supply such that the amount of liquid fuel supplied being increased and an amount of gaseous fuel supplied being decreased in order to purge the cylinder and the fuel injector nozzle.

10. The method of claim 9, wherein the corrective action control signal includes controlling the liquid fuel supply to inject the liquid fuel into the cylinder as long as at least one of the cylinder pressure and the exhaust temperature is determined outside of the respective pre-determined pressure range and the pre-determined temperature range.

11. The method of claim 7, wherein the electronic controller is configured to store a cylinder condition signal to create a cylinder condition log and the electronic controller is programmed to analyze the cylinder condition log to predict a future cylinder condition and to predict a future maintenance condition of a liquid fuel supply, and a gaseous fuel supply.

12. The method of claim 7, wherein, when the dual fuel engine is determined to be operating in the motoring condition, the electronic controller activates a pre-emptive motoring operation mode.

13. A machine, comprising:
a frame;
a dual fuel engine mounted on the frame, the dual fuel engine including a plurality of cylinders configured to combust a liquid fuel and a gaseous fuel;
a liquid fuel source in communication with each of the plurality of cylinders and configured to supply the liquid fuel to each cylinder of the plurality of cylinders;
a gaseous fuel source in communication with each of the plurality of cylinders and configured to supply the gaseous fuel to each cylinder of the plurality of cylinders;
a pressure sensor operably coupled to each cylinder of the plurality of cylinders and configured to monitor and measure a cylinder pressure and transmit a cylinder pressure signal;
an engine speed sensor configured to monitor an output speed of the dual-fuel engine and transmit an engine speed signal; and
an electronic controller communicably coupled with the liquid fuel source, the gaseous fuel source, the pressure sensor, and the engine speed sensor, the electronic controller configured to receive the cylinder pressure signal from the pressure sensor of each cylinder of the plurality of cylinders, determine whether the cylinder pressure is above a pre-determined pressure range and at least one cylinder of the plurality of cylinders is operating in a misfire condition based on the received cylinder pressure signal, receive the engine speed signal from the engine speed sensor, determine whether the engine speed is below a pre-determined threshold and the dual-fuel engine is in a motoring condition based on the received engine speed signal wherein the motoring condition is when the machine which is propelled by the dual fuel engine is propelled down a grade by gravity, and when the electronic controller determines that the cylinder pressure is above the pre-determined pressure range and a particular cylinder of the plurality of cylinders is operating in the misfire condition during a determined motoring condition the electronic controller sends a control signal to increase an injection of the liquid fuel supply into the particular cylinder of the plurality of cylinders to purge an amount of backflow gas from the cylinder and a fuel injector nozzle during the determined motoring condition to lower the cylinder pressure within the pre-determined pressure range.

14. The machine of claim 13, further comprising a temperature sensor operably coupled to an exhaust port and configured to measure an exhaust temperature of each cylinder of the plurality of cylinders, the temperature sensor further configured to transmit an exhaust temperature signal to the electronic controller, and wherein the electronic controller is programmed to determine whether the exhaust temperature is within a pre-determined temperature range and transmit the control signal based on the exhaust temperature.

15. The machine of claim 14, wherein at least one of the cylinder pressure and the exhaust temperature is determined outside of the respective pre-determined pressure range and the pre-determined temperature range, the electronic controller is programmed to transmit a corrective action control signal to each of the liquid fuel source and the gaseous fuel source such that the liquid fuel source is controlled to supply an increased amount of the liquid fuel into each of the plurality of cylinders and the gaseous fuel source is controlled to supply a reduced amount of gaseous fuel into each of the plurality of cylinders in order to purge each of the plurality of cylinders and fuel injector nozzles.

16. The machine of claim 15, wherein the corrective action control signal commands the liquid fuel source to inject the liquid fuel into each cylinder of the plurality of cylinders as long as at least one of the cylinder pressure and the exhaust temperature is determined outside of the pre-determined pressure range and the pre-determined temperature range, and wherein the electronic controller is configured to store the corrective action control signal to create a corrective action log, and the electronic controller is programmed to analyze the corrective action log to predict a future cylinder condition and to predict a future maintenance condition of each fuel injector, the liquid fuel source, and the gaseous fuel source.

17. The machine of claim 13, wherein, when the dual fuel engine is determined to be operating in a motoring mode, the electronic controller activates a pre-emptive motoring operation mode.

* * * * *